(12) United States Patent
Ho

(10) Patent No.: US 6,167,841 B1
(45) Date of Patent: Jan. 2, 2001

(54) PET FOOD FEEDING APPARATUS

(76) Inventor: Shih-Chung Ho, 22, Alley 18, Lane 75, Anping Road, Tainan City (TW)

( * ) Notice: Under 35 U.S.C. 154(b), the term of this patent shall be extended for 0 days.

(21) Appl. No.: 09/330,363

(22) Filed: Jun. 11, 1999

(30) Foreign Application Priority Data

Feb. 4, 1999 (TW) .................................................. 88201850

(51) Int. Cl.⁷ .................................................. A01K 29/00
(52) U.S. Cl. .................... 119/61; 119/57.91; 446/396; 446/475; 222/463; 473/594
(58) Field of Search .................... 119/702, 707, 119/709, 710, 711, 51.01, 57.19, 61, 51.03, 174; 446/396, 325, 475; 222/164, 166, 463; 473/569, 594

(56) References Cited

U.S. PATENT DOCUMENTS

| | | | |
|---|---|---|---|
| 901,762 | * 10/1908 | Wetzel | 446/297 |
| 2,146,487 | * 2/1939 | Schroeder | 222/162 |
| 2,606,691 | * 8/1952 | Lindly | 222/142.2 |
| 3,847,305 | * 11/1974 | Tobin | 222/166 |
| 4,890,838 | * 1/1990 | Rudell et al. | 273/138.1 |
| 4,915,267 | * 4/1990 | Buecheler et al. | 222/463 |
| 5,277,641 | * 1/1994 | Gable et al. | 446/46 |
| 5,758,604 | * 6/1998 | Jorgensen | 119/711 |
| 5,819,690 | * 10/1998 | Brown | 119/707 |
| 5,865,147 | * 2/1999 | Rubin | 119/711 |
| 6,073,581 | * 6/2000 | Wang | 119/51.01 |

* cited by examiner

Primary Examiner—Michael J. Carone
Assistant Examiner—James S. Bergin
(74) Attorney, Agent, or Firm—Pro-Techtor International Services

(57) ABSTRACT

A pet food feeding apparatus, which includes a bowl-like base having a flat bottom wall, a hollow top cover shell covered on the base, the top cover shell having a plurality of outlets spaced around the periphery, a pan mounted in between the base and the top cover shell to hold pet food, and a weight fixedly fastened to the base at the center for enabling the center of gravity of the pet food feeding apparatus to be kept at the center of the flat bottom wall of the base, such that the pet food feeding apparatus is oscillated to force pet food out of the outlets when the pet touches or pushes the pet food feeding apparatus.

1 Claim, 5 Drawing Sheets

PET FOOD FEEDING APPARATUS

BACKGROUND OF THE INVENTION

The present invention relates to a pet food feeding apparatus, and more specifically to a tumbler-like pet food feeding apparatus that forces pet food to the outside for eating when oscillated by the pet.

When feeding pet food to a pet, a pet food feeding apparatus may be used. FIG. 1 shows a pet food feeding container A for this purpose. As illustrated, pet food B is directly put in the pet food feeding container A, and the pet C can directly take up pet food B from the pet food feeding container A. Because the pet C can get pet food B easily, using this kind of pet food feeding apparatus cannot train the intelligence of the pet C.

SUMMARY OF THE INVENTION

The present invention provides a pet food feeding apparatus which lures the pet with a pet food smell, enabling the intelligence of the pet to be trained when searching pet food. According to the present invention, the pet food feeding apparatus comprises a hollow base, a hollow top cover shell covered on the base, and a pan retained in between the base and the top cover shell. The base has a weight at the center of its flat bottom wall. The top cover shell has outlets around the periphery. Pet food is forced out of the outlets for eating when the pet food feeding apparatus is oscillated by the pet.

DETAILED DESCRIPTION OF THE PREFERRED EMBODIMENT

Figure 1:
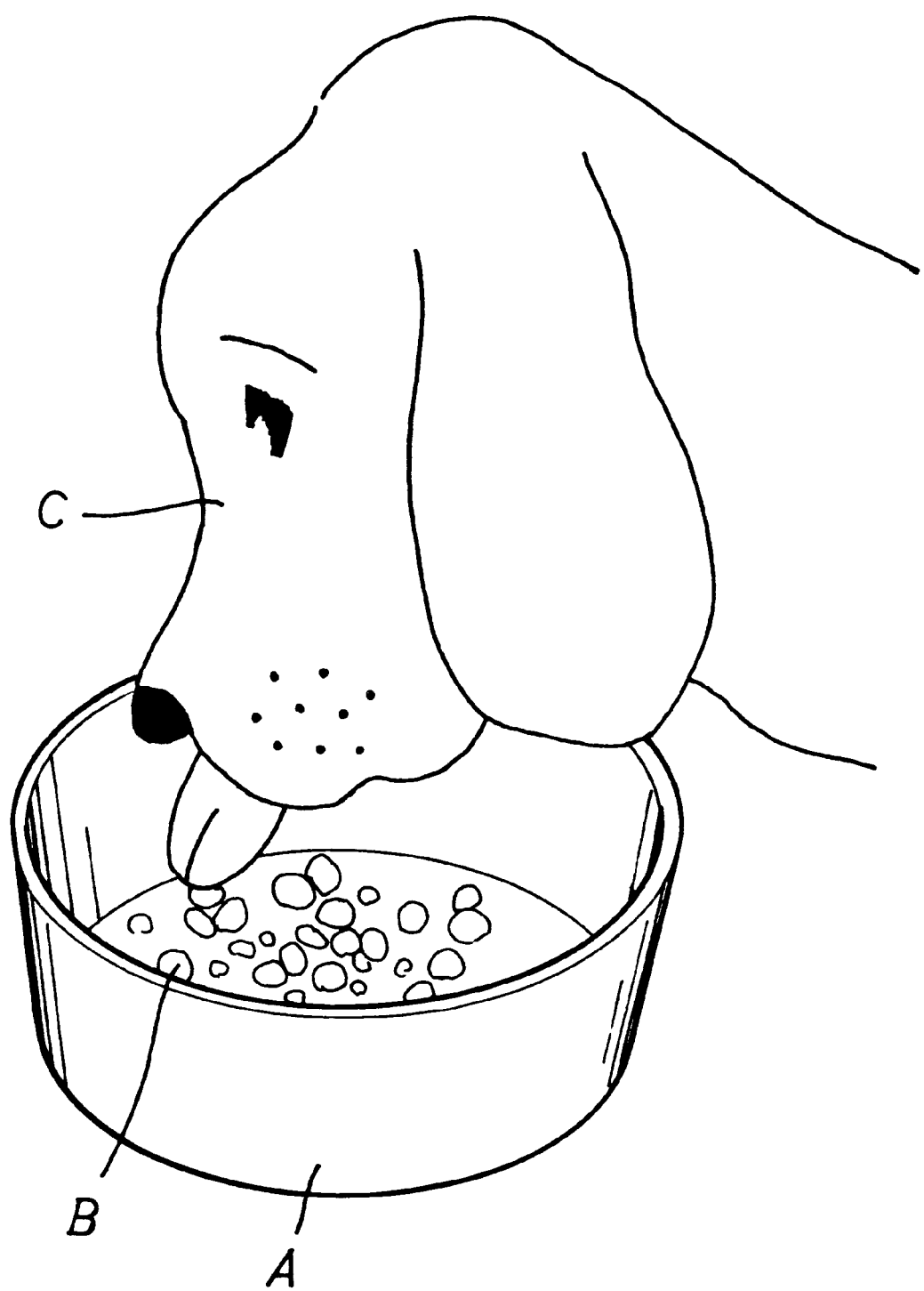
FIG. 1 illustrates a pet food feeding container according to the prior art.
Figure 2:
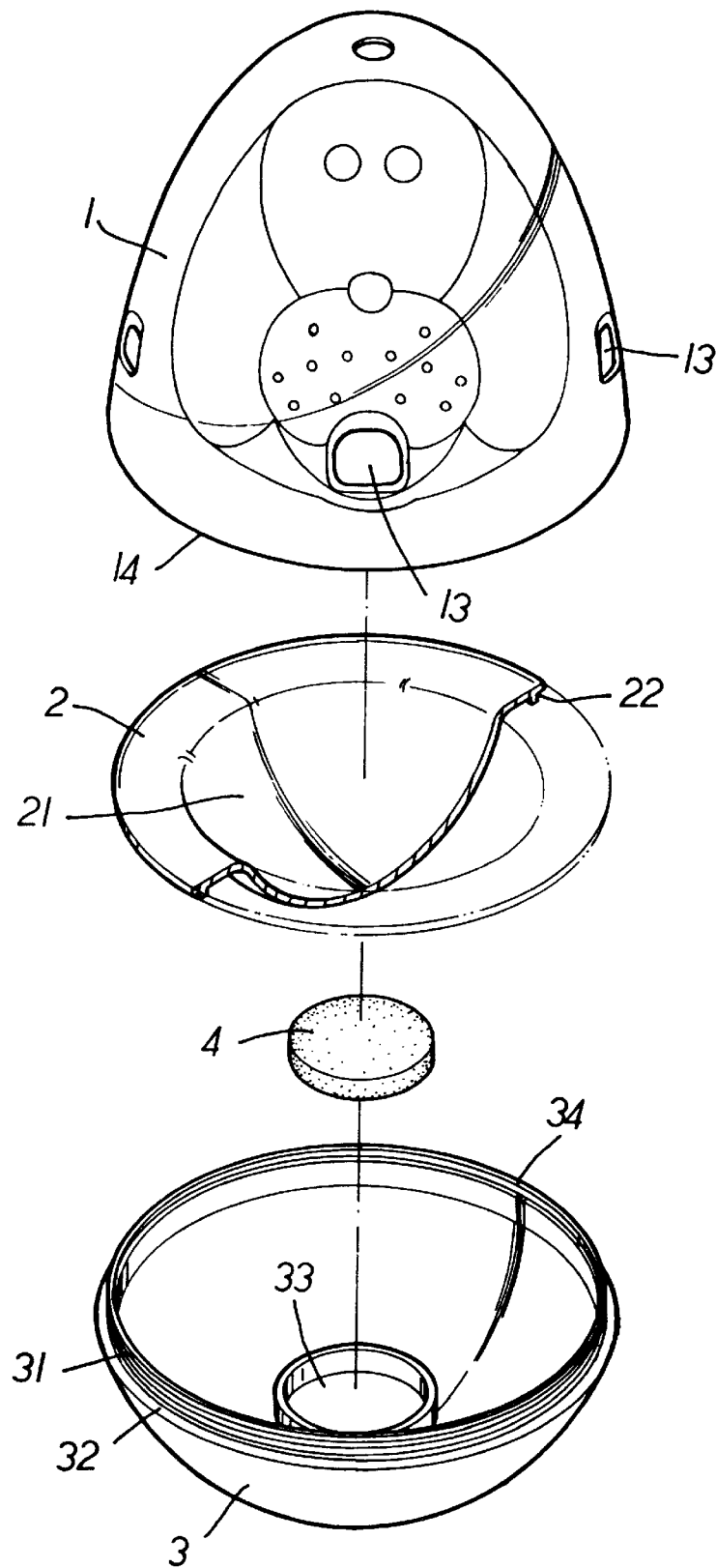
FIG. 2 is an exploded view of a pet food feeding apparatus according to the present invention.
Figure 3:
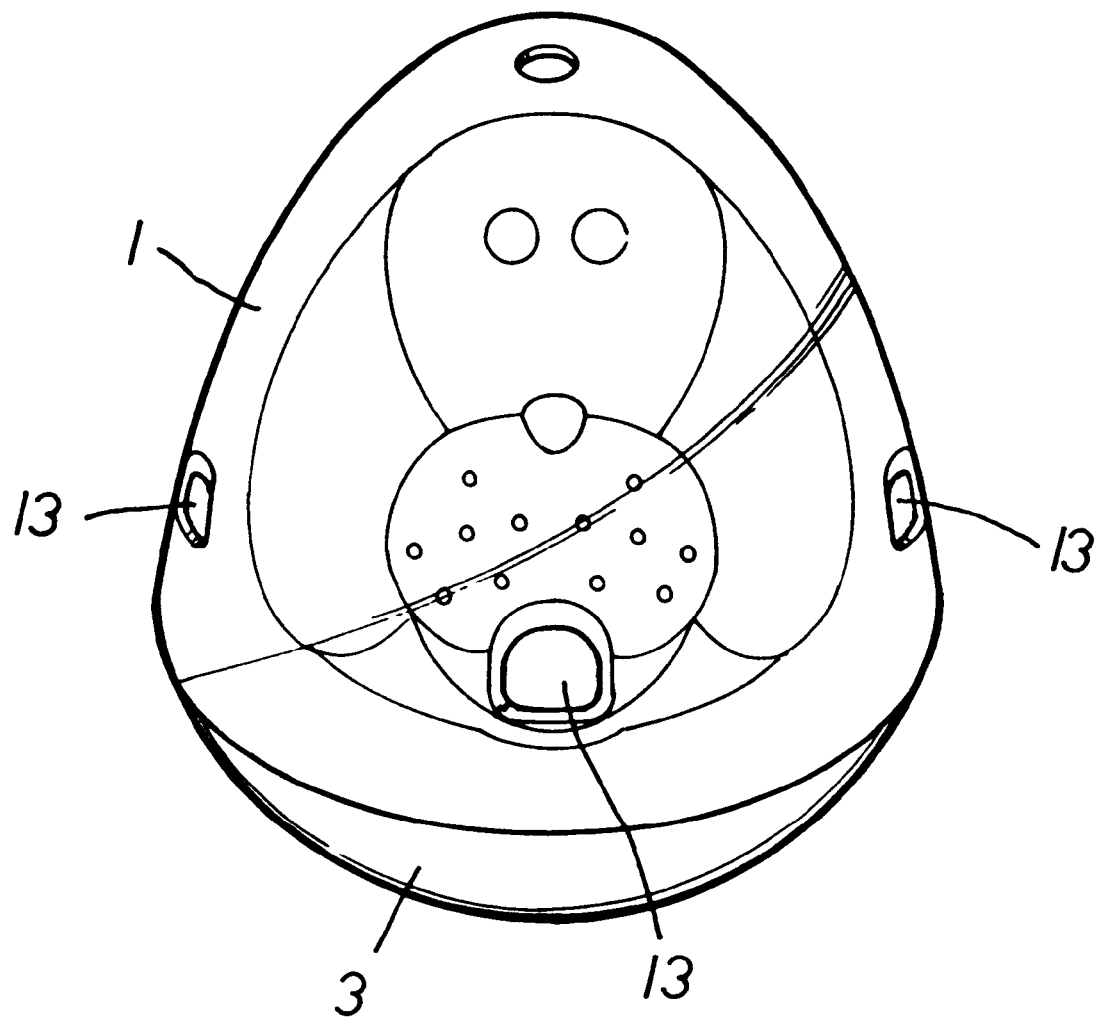
FIG. 3 is an elevational view of the pet food feeding apparatus according to the present invention.
Figure 4:
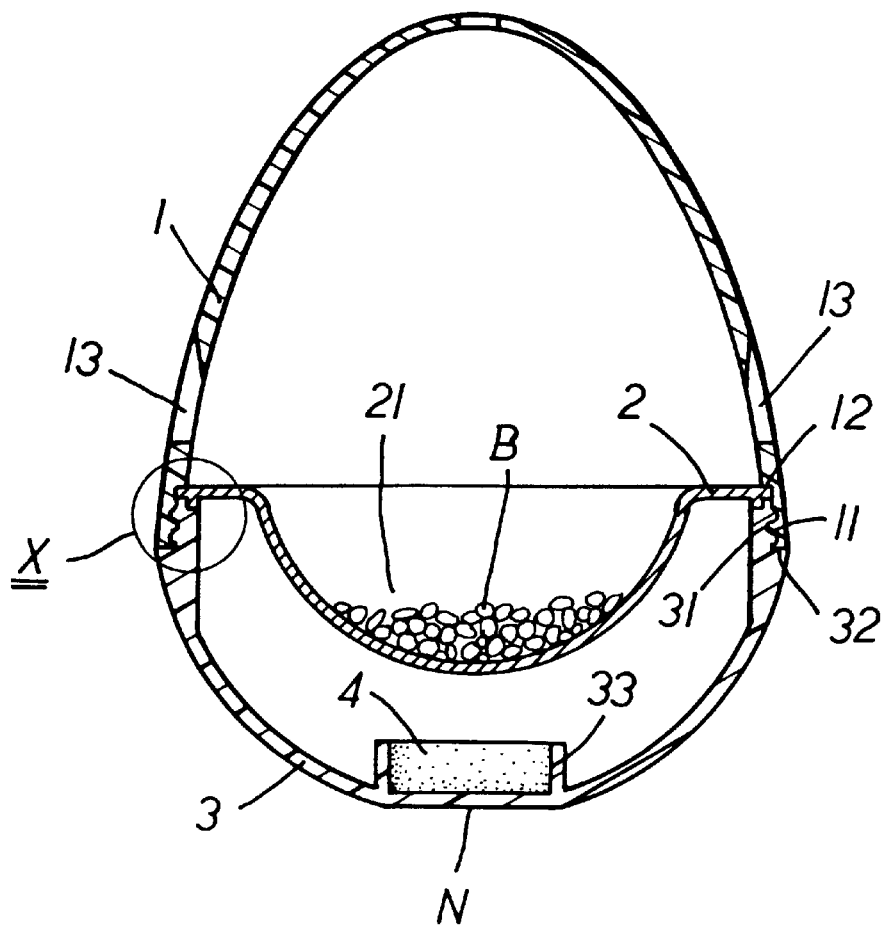
FIG. 4 is a sectional assembly view of the pet food feeding apparatus according to the present invention.

Referring to FIGS. 2, 3 and 4, a pet food feeding apparatus is shown shaped like an egg, and comprised of a top cover shell 1, a pan 2, and a base 3.

The cover shell 1 is a hollow, rounded, bottom-open cap, having an inner thread 11 around the bottom opening thereof, an inside annular coupling flange 12 raised around the inside wall thereof above the inner thread 11, and a plurality of outlets 13 around the periphery. The pan 2 is a hollow, rounded dish having a top recess 21 for holding pet food B (see FIG. 4), and a bottom coupling flange 22 around the periphery. The base 3 is shaped like a bowl having a flat bottom wall N at the center (see FIG. 4), a receptacle 33 raised from the flat bottom wall N on the inside, a weight 4 fixedly mounted within the receptacle 3, an outer thread 31 around the periphery at the top, and a step 32 around the periphery below the outer thread 31.

Figure 5:
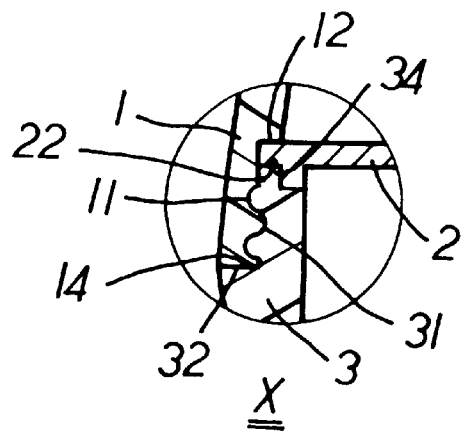
FIG. 5 is an enlarged view of a part of FIG. 4.

Referring to FIG. 5 and FIGS. from 2 through 4 again, the pan 2 is covered on the base 3 by forcing the coupling flange 22 of the pan 2 into engagement with the topmost edge 34 of the base 3, then the cover shell 1 is fastened to the base 3 and covered over the pan 2 by threading the inner thread 11 of the cover shell 1 onto the outer thread 31 at the base 3, enabling the lowest edge 14 of the cover shell 1 to be abutted against the step 32 at the base 3 and the inside annular coupling flange 12 of the cover shell 1 to be pressed on the pan 2 (see FIG. 5). When assembled, the pan 2 is firmly retained in between the base 3 and the cover shell 2 and kept from sight (see FIGS. 3 and 4), and the outlets 13 are maintained in communication with the holding space of the top recess 21, and therefore pet food B can be pulled out of the outlets 13. Because the base 3 has a flat bottom wall N, the pet food feeding apparatus can be stably supported on a flat surface. Further, the installation of the weight 4 enables the center of gravity of the pet food feeding apparatus to be kept at the flat bottom wall N of the base 3.

Figure 6:
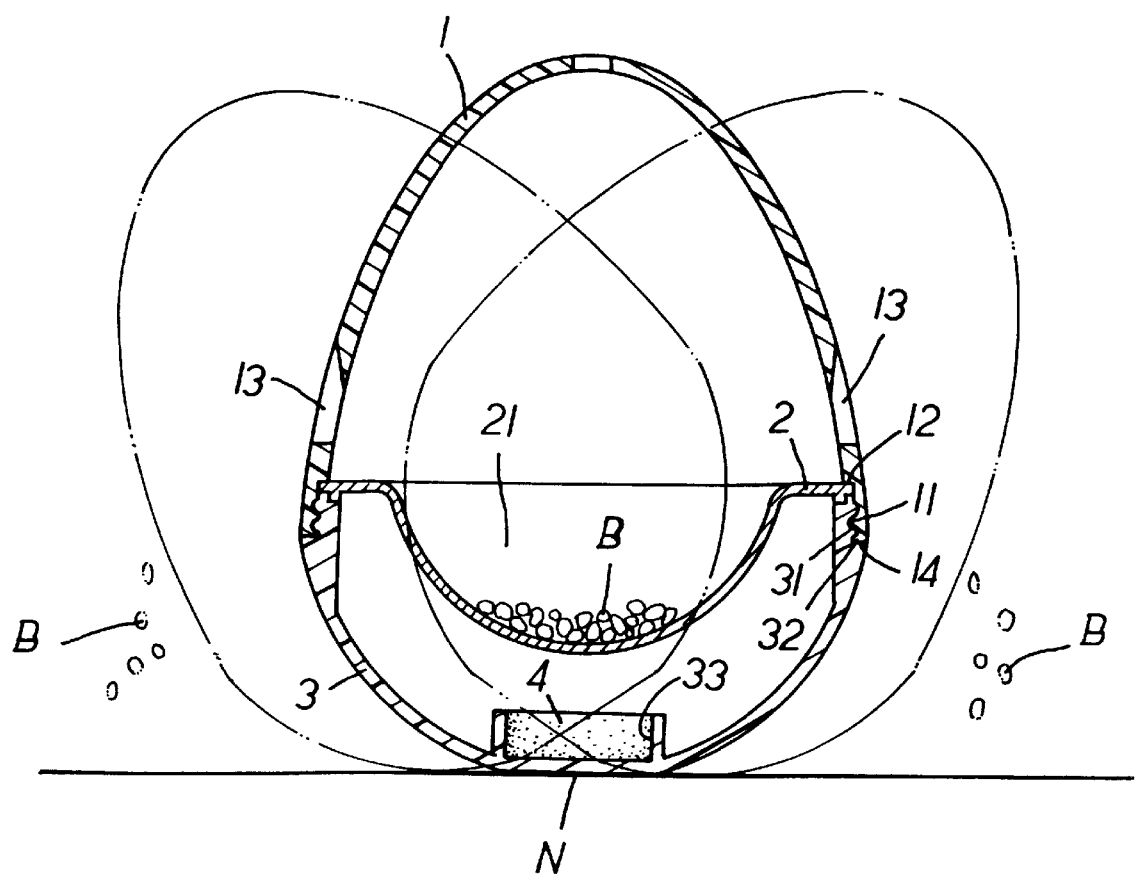
FIG. 6 shows the pet food feeding apparatus oscillated, pet food forced out of the outlets according to the present invention.

Referring to FIG. 6, the good smell of pet food B escapes out of the outlets 13 to attract the pet, and the pet may try to find out the source of good smell. If the pet touches or pushes the pet food feeding apparatus with the head or the legs, the pet food feeding apparatus will be oscillated like a tumbler, and pet food will be forced out of the pet food feeding apparatus through the outlets 13 when the pet food feeding apparatus is oscillated.

While only one embodiment of the present invention has been shown and described, it will be understood that various modifications and changes could be made thereunto without departing from the spirit and scope of the invention disclosed.

What is claimed is:

1. A pet food feeding apparatus comprising:

a bowl-like base, said base having a flat bottom wall at the center thereof, a top cover shell covering said base, said top cover shell comprising at least one outlet near a bottom side thereof, a pan mounted between said base and said top cover shell, said pan having a top recess for holding pet food, and weight means fixedly fastened to an interior of said flat bottom wall of said base to lower the center of gravity of said pet food feeding apparatus; wherein said top cover shell is fastened to said base by a screw joint, and said top cover shell has an inside annular flange that contacts said pan.

* * * * *